United States Patent
Jiang et al.

(10) Patent No.: US 10,748,061 B2
(45) Date of Patent: Aug. 18, 2020

(54) SIMULTANEOUS LOCALIZATION AND MAPPING WITH REINFORCEMENT LEARNING

(71) Applicant: Futurewei Technologies, Inc., Plano, TX (US)

(72) Inventors: Wei Jiang, Santa Clara, CA (US); Wei Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 817 days.

(21) Appl. No.: 15/383,804

(22) Filed: Dec. 19, 2016

(65) Prior Publication Data
US 2018/0174038 A1   Jun. 21, 2018

(51) Int. Cl.
| | | |
|---|---|---|
| G06N 3/08 | (2006.01) | |
| G06N 3/04 | (2006.01) | |
| B25J 9/16 | (2006.01) | |
| G06N 7/00 | (2006.01) | |
| G06N 3/00 | (2006.01) | |

(52) U.S. Cl.
CPC ............ G06N 3/08 (2013.01); B25J 9/163 (2013.01); G06N 3/008 (2013.01); G06N 7/005 (2013.01); *G06N 3/0454* (2013.01); *Y10S 901/47* (2013.01)

(58) Field of Classification Search
CPC ........ G06N 3/008; G06N 3/08; G06N 3/0454; B25J 9/163
See application file for complete search history.

(56) References Cited

U.S. PATENT DOCUMENTS

| | | | | |
|---|---|---|---|---|
| 9,701,020 | B1* | 7/2017 | Ebrahimi Afrouzi | ................... |
| | | | | G05D 1/0219 |
| 2014/0129027 | A1* | 5/2014 | Schnittman | .......... G05D 1/0219 |
| | | | | 700/253 |
| 2014/0323148 | A1* | 10/2014 | Schmalstieg | ........ G01C 21/005 |
| | | | | 455/456.1 |
| 2018/0129974 | A1* | 5/2018 | Giering | .................. G06N 5/022 |
| 2018/0161986 | A1* | 6/2018 | Kee | ..................... G06K 9/00664 |

(Continued)

OTHER PUBLICATIONS

"Robust camera pose and scene structure analysis for service robotics," Sorin M. Grigorescu, Gigel Macesanu, Tiberiu T. Cocias, Dan Puiu, Florin Moldoveanu, Robotics and Autonomous Systems 59 (2011) 899-909, Jul. 27, 2011 (Year: 2011).*

(Continued)

Primary Examiner — Hal Schnee
(74) Attorney, Agent, or Firm — Schwegman Lundberg & Woessner, P.A.

(57) ABSTRACT

A robotic device is disclose as having deep reinforcement learning capability. The device includes non-transitory memory comprising instructions and one or more processors in communication with the memory. The instructions cause the one or more processors to receive a sensing frame, from a sensor, comprising an image. The processors then determine a movement transition based on the sensing frame and the deep reinforcement learning, wherein the deep reinforcement learning uses at least one of a map coverage reward, a map quality reward, or a traversability reward to determine the movement transition. The processors then update an area map based on the sensing frame and the deep reinforcement learning using a visual simultaneous localization and mapping (SLAM) process to determine the map updates.

20 Claims, 4 Drawing Sheets

(56) References Cited

U.S. PATENT DOCUMENTS

2018/0165603 A1* 6/2018 Van Seijen ............ G06N 3/006
2019/0332920 A1* 10/2019 Sermanet .............. G06N 3/006

OTHER PUBLICATIONS

"The Q-learning obstacle avoidance algorithm based on EKF-SLAM for NAO autonomous walking under unknown environments," Shuhuan Wen, Xiao Chen, Chunli Ma, H.K. Lam, and Shaoyang Hua, Robotics and Autonomous Systems 72 (2015) 29-36, Apr. 23, 2015 (Year: 2015).*
Tai, Lei, and Ming Liu. "A robot exploration strategy based on q-learning network." 2016 IEEE International Conference on Real-time Computing and Robotics (RCAR). IEEE, 2016. (Year: 2016).*
Arana-Daniel, Nancy, et al., "Reinforcement Learning-SLAM for finding minimum cost path and mapping", World Automation Congress 2012, IEEE, (2012), 6 pgs.
Grisetti, Giorgio, et al., "Improved Techniques for Grid Mapping with Rao-Blackwellized Particle Filters", IEEE Transactions on Robotics, vol. 23, 2007, (2007), 12 pgs.
Klein, Georg, et al., "Parallel Tracking and Mapping on a Camera Phone", IEEE International Symposium on Mixed and Augmented Reality 2009 Science and Technology Proceedings, Oct. 19-22, 2009, Orlando, Florida, (Oct. 19, 2009), 4 pgs.
Kollar, Thomas, et al., "Trajectory Optimization using Reinforcement Learning for Map Exploration", The International Journal of Robotics Research, Feb. 2008, vol. 27, No. 2, 175-196, (Feb. 2008), 175-196.
Mnih, Volodymyr, et al., "Human-level control through deep reinforcement learning", Nature, vol. 518, Feb. 26, 2015, pp. 529-542, (Feb. 26, 2015), 529-542.

* cited by examiner

SIMULTANEOUS LOCALIZATION AND MAPPING WITH REINFORCEMENT LEARNING

FIELD OF THE INVENTION

The present disclosure is related to autonomous mobile robotics, and in particular to visual simultaneous localization and mapping (SLAM) with deep reinforcement learning.

BACKGROUND

Robotic devices are used increasingly to perform tasks such as moving through unknown and/or changing environments to deliver supplies for manufacturing, search and rescue operations, or other similar operations. Thus, autonomous movement of the robotic devices is an important function.

SLAM technology is an important aspect to movement in such an environment. A robotic device using the SLAM process builds and maintains a two (2D) or three dimensional (3D) map of the unknown environment and, at the same time that it is building the map, localizes itself within that environment. However, there are several challenges for SLAM to be effective.

For example, camera localization and tracking may be unstable when there are large, textureless regions in the mapped area. Also, dynamic objects that move through the mapped area need to be avoided but also not added to the map since they are outliers that are not part of that particular environment. The SLAM process does not take these problems into account when building maps.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In one example, a robotic device has deep reinforcement learning capability. The robotic device includes non-transitory memory comprising instructions. One or more processors are in communication with the memory, wherein the one or more processors execute the instructions. The instructions include receiving a sensing frame, from a sensor, comprising an image. A movement transition is determined based on the sensing frame and the deep reinforcement learning, wherein the deep reinforcement learning uses at least one of a map coverage reward, a map quality reward, or a traversability reward to determine the movement transition. An area map is updated based on the sensing frame and the deep reinforcement learning using a visual simultaneous localization and mapping (SLAM) process to determine the map updates.

In another example, a computer-implemented method includes mapping with deep reinforcement learning in a robotic device. The method receives a sensing frame, from one or more sensors, comprising an image. Robotic device movement is determined based on the sensing frame and the deep reinforcement learning, wherein the deep reinforcement learning uses a plurality of rewards to determine a selected action for the robotic device movement. An area map is updated based on the sensing frame and the deep reinforcement learning using a visual simultaneous localization and mapping (SLAM) process to determine the map updates.

In another example, a non-transitory computer-readable media stores computer instructions for visual simultaneous localization and mapping with deep reinforcement learning in a robotic device, that when executed by one or more processors, cause the one or more processors to perform steps. The steps include receiving a sensing frame, from a sensor, comprising an image. Robotic device direction of movement is determined based on the sensing frame and the deep reinforcement learning, wherein the deep reinforcement learning uses a total reward comprising a map coverage reward, a map quality reward, and a traversability reward to determine the robotic device movement. An area map is updated based on the sensing frame and the deep reinforcement learning using a visual simultaneous localization and mapping (SLAM) process to determine map updates.

DETAILED DESCRIPTION

A deep reinforcement learning (DRL)-assisted SLAM method is used in robotic navigation and object avoidance using pre-built area maps that are dynamically updated. The method uses a deep Q-Network (DQN) framework with the SLAM framework where the DQN framework is a combination of the DRL and deep neural network function approximators. The DRL may also be used to facilitate the SLAM in building an initial map, dynamically updating the map, and planning an optimal path for a robotic device to move through an unknown dynamic environment.

The DRL-assisted SLAM method improves the effectiveness of SLAM and map building by planning the optimal path for the robotic device to map the environment. The method also improves the effectiveness of SLAM by avoiding failures in camera localization and camera tracking during movement of the robotic device.

The DRL-assisted SLAM method combines DQN with the SLAM framework. The DQN uses a deep convolutional neural network (CNN) as a function approximator to estimate the action-value function between the input sensing pixels of a received frame and the output Q-value, where the Q-value is defined to improve the efficiency and robustness of SLAM. The DQN uses CNN over pixel inputs to parameterize a state-action value function and is trained using Q-learning combined with several approaches to stabilize the training of the network. For example, the approaches may include memory and a separate target network to define a more consistent temporal difference error.

The DRL-assisted SLAM method uses reward functions for computing the Q-value. For example, a map coverage reward may be used to avoid redundant map traversal. A map quality reward may be used to avoid tracking failures in SLAM. A map traversability reward may be used to avoid dynamic obstacles. By training over a large set of SLAM examples in various static and/or dynamic environments, the method can conduct SLAM operations in an unknown dynamic environment with the help of the trained DQN to avoid the SLAM tracking failures, redundant map traversal, and dynamic obstacles.

As used herein, the DQN may be defined as an artificial intelligence agent that can learn using successful policies directly from high-dimensional sensory inputs using end-to-end reinforcement learning. Reinforcement learning may be used in situations approaching real-world complexity when people are confronted with a difficult task. People derive efficient representations of the environment from high-dimensional sensory inputs and use these inputs to generalize past experiences and apply them to new situations. Humans and other animals seem to solve this problem through a combination of reinforcement learning and hierarchical sensory processing systems.

Figure 1:
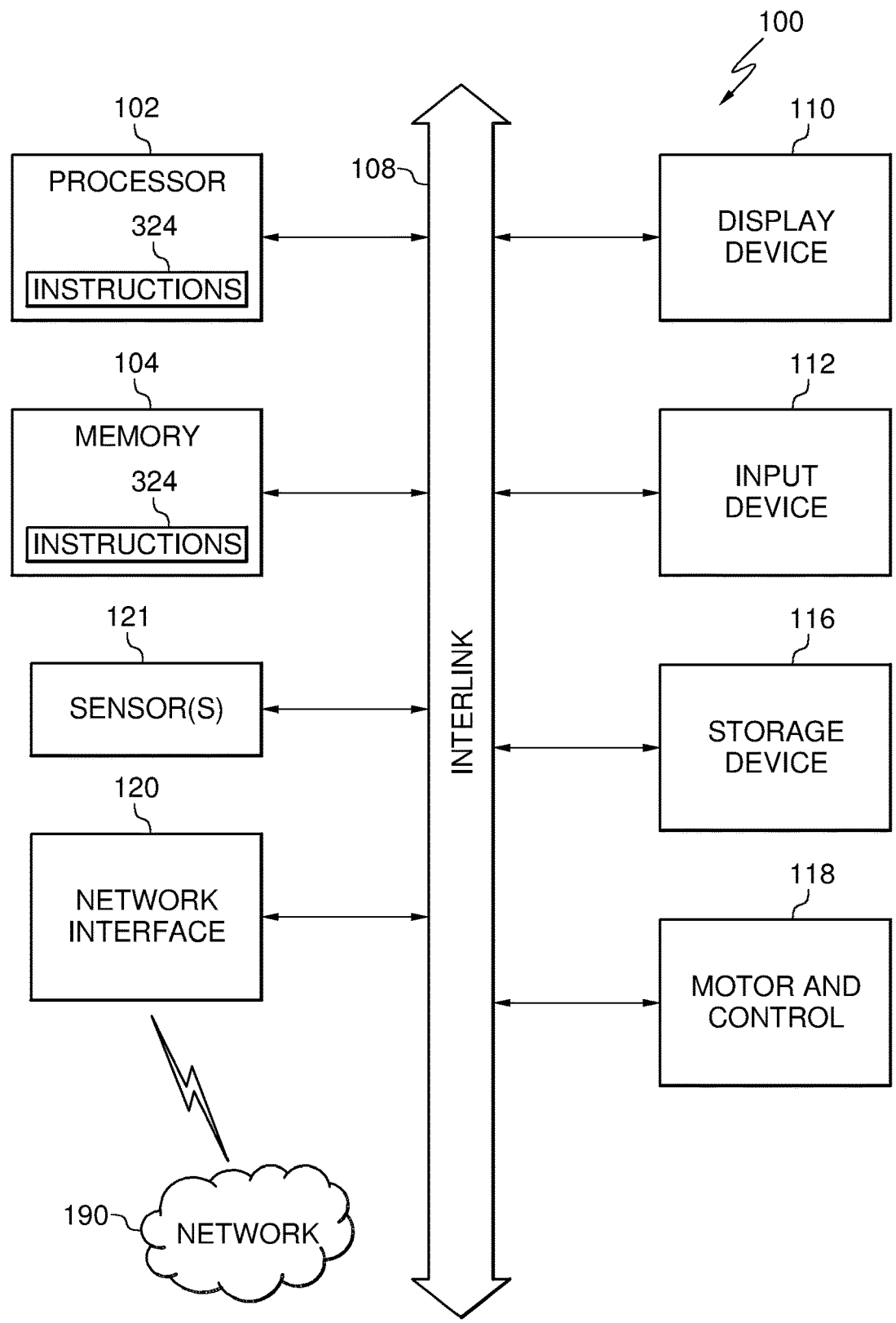
FIG. 1 is a block diagram of a robotic device for implementing algorithms and performing methods, according to various embodiments.

FIG. 1 is a block diagram of a robotic device 100 for implementing algorithms and performing methods, according to various embodiments. The robotic device 100 may also be referred to as a computer to execute any methods disclosed herein. This block diagram is for purposes of illustration only as other systems may have a different architecture and still be able to implement any methods disclosed herein.

The robotic device 100 may include a processor 102 (e.g., a central processing unit (CPU), a graphics processing unit (GPU), a processor core, or any combination thereof), and memory 104. The various elements of the robotic device may communicate with each other over an interlink (i.e. bus) 108.

The memory 104 may include at least one non-transitory computer-readable medium on which is stored one or more sets of data structures or instructions 124 (e.g., software, firmware) embodying or utilized by any one or more of the techniques, methods, or functions described herein. The instructions 124 may also reside, at least partially, in additional computer-readable memories such within the processor 102 during execution thereof by the robotic device 100.

One or any combination of the processor 102, the memory 104 or the mass storage device 116 may constitute non-transitory computer-readable media. The software, when executed by the underlying hardware of the device, causes the hardware to perform the specified operations of the methods described herein.

The memory 104 may include volatile memory and/or non-volatile memory. For example, the memory 104 may include one or more of random access memory (RAM), read only memory (ROM), erasable programmable read-only memory (EPROM) and electrically erasable programmable read-only memory (EEPROM), flash memory or other memory technologies. The mass storage device 116 may include solid state disks (SSD), magnetic disks, optical disks, or any other form of mass storage memory.

The robotic device 100 may further include a display unit 110 and an alphanumeric input device 112 (e.g., a keypad, keyboard) coupled to the interlink 108. In an example, the display unit 110 and the input device 112 together may be a touchscreen display.

The robotic device 100 may additionally include a motor 118. The motor 118 and associated motor control circuits generate the necessary signals and control, based on the methods described herein, to move the robotic device.

One or more sensors 121 may include position and movement sensors such as accelerometers, compasses, gyroscopes, altimeters, barometers, thermometers, vertical speed sensors, radar, LIDAR, and/or GPS receivers. The sensors 121 may additionally include imaging sensors to generate frames of images. Each frame comprising a plurality of pixels (e.g., picture elements).

A network interface device 120 may include any necessary circuits for communicating over a wireless or wireline channel. For example, the network interface device 120 may include one or more radio frequency (RF) transmitters and/or receivers (i.e. radios).

The radios may operate using one or more of global system for mobile communication (GSM), code division multiple access (CDMA), Bluetooth®, IEEE 802.11, LTE, or any other standard for communication over a wireless channel with a network 190. The network 190 may be a Wi-Fi network, a cellular network, a peer-to-peer network, a local area network (LAN), or a wide area network (WAN) including the Internet.

Figure 2:
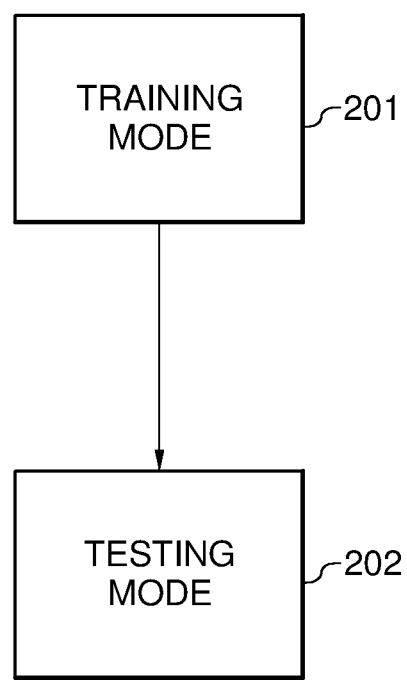
FIG. 2 is a flowchart of a method for performing visual SLAM with deep reinforcement learning, according to various embodiments.

FIG. 2 is a flowchart of a method for performing visual SLAM with deep reinforcement learning, according to various embodiments. The method includes both a training mode 201 and a testing mode 202.

In the training mode 201, described in greater detail with reference to FIG. 3, the robotic device operates with a number of SLAM example environments having different static and/or dynamic environments. A static environment may be defined as one in which all of the obstacles are stationary and their locations are known. The locations of the obstacles may be predetermined using x-y coordinates, in a two dimensional area map, or x-y-z coordinates in a three dimensional area map. A dynamic environment may be defined as one in which all of the obstacles are moving and cannot be predetermined. An environment that is a combination of both static and dynamic may be defined as one in which both static and dynamic obstacles exist. In other words, obstacles exist in the combination environment that include both predefined obstacles that have particular x-y or x-y-z coordinates as well as moving obstacles whose locations cannot be predefined due to their movement.

The training mode 201 may be performed using computer simulations with the different computer-generated SLAM environments. In another embodiment, the different environments may be set up physically and the robotic device physically moves through the environments.

Figure 4:
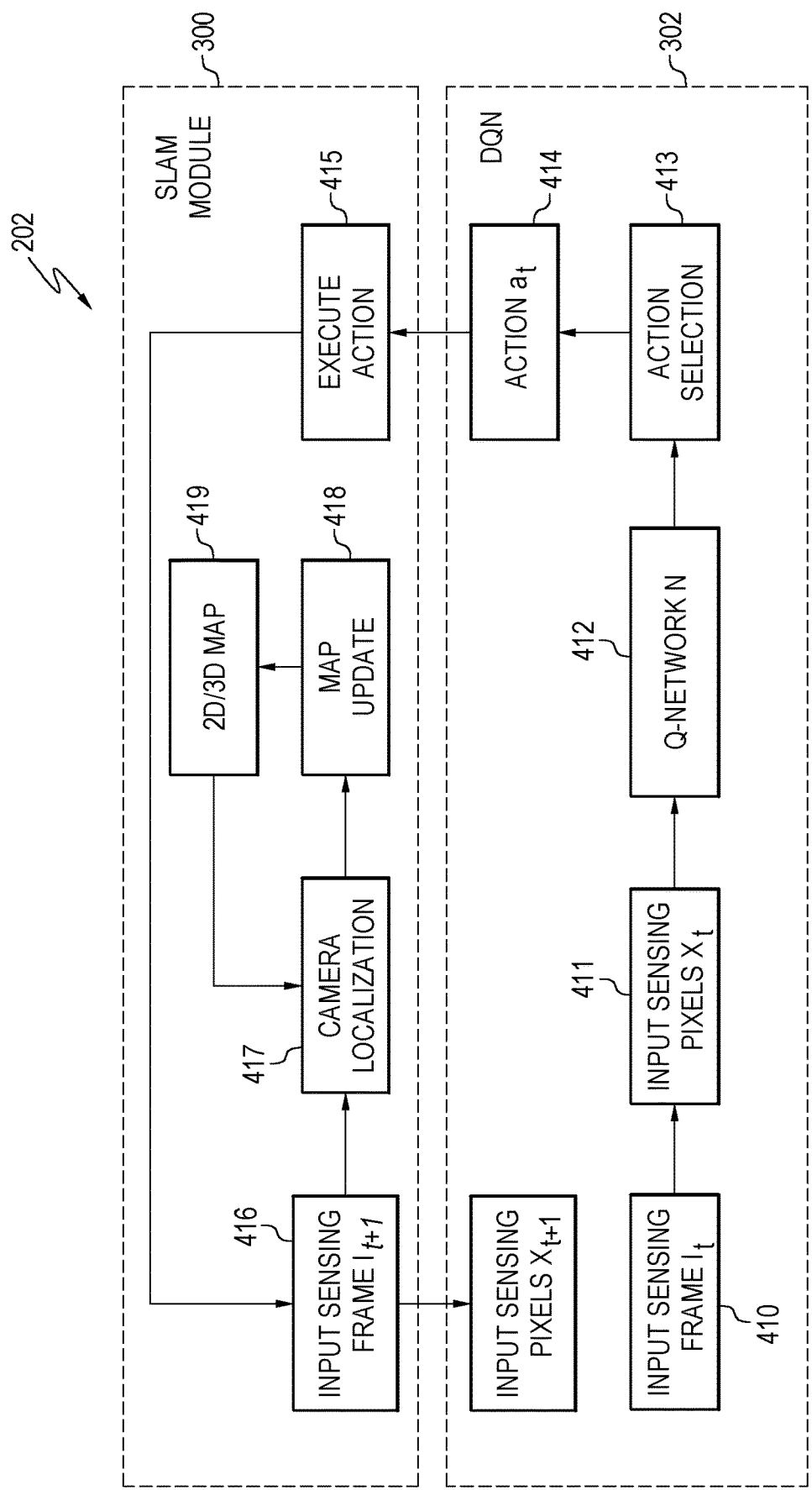
FIG. 4 is a flowchart of a method for performing a testing mode, according to the embodiment of FIG. 2.

After the training mode 201, the testing mode 202 may be executed. An embodiment of the testing mode 202 is illustrated in FIG. 4.

In the testing mode 202, the robotic device can effectively conduct SLAM in new and unknown environments with the help of the now trained Q-network obtained from the training mode 201. The testing mode 202 may now be able to avoid SLAM tracking failures, redundant map traversals, and dynamic obstacles as described subsequently.

Figure 3:
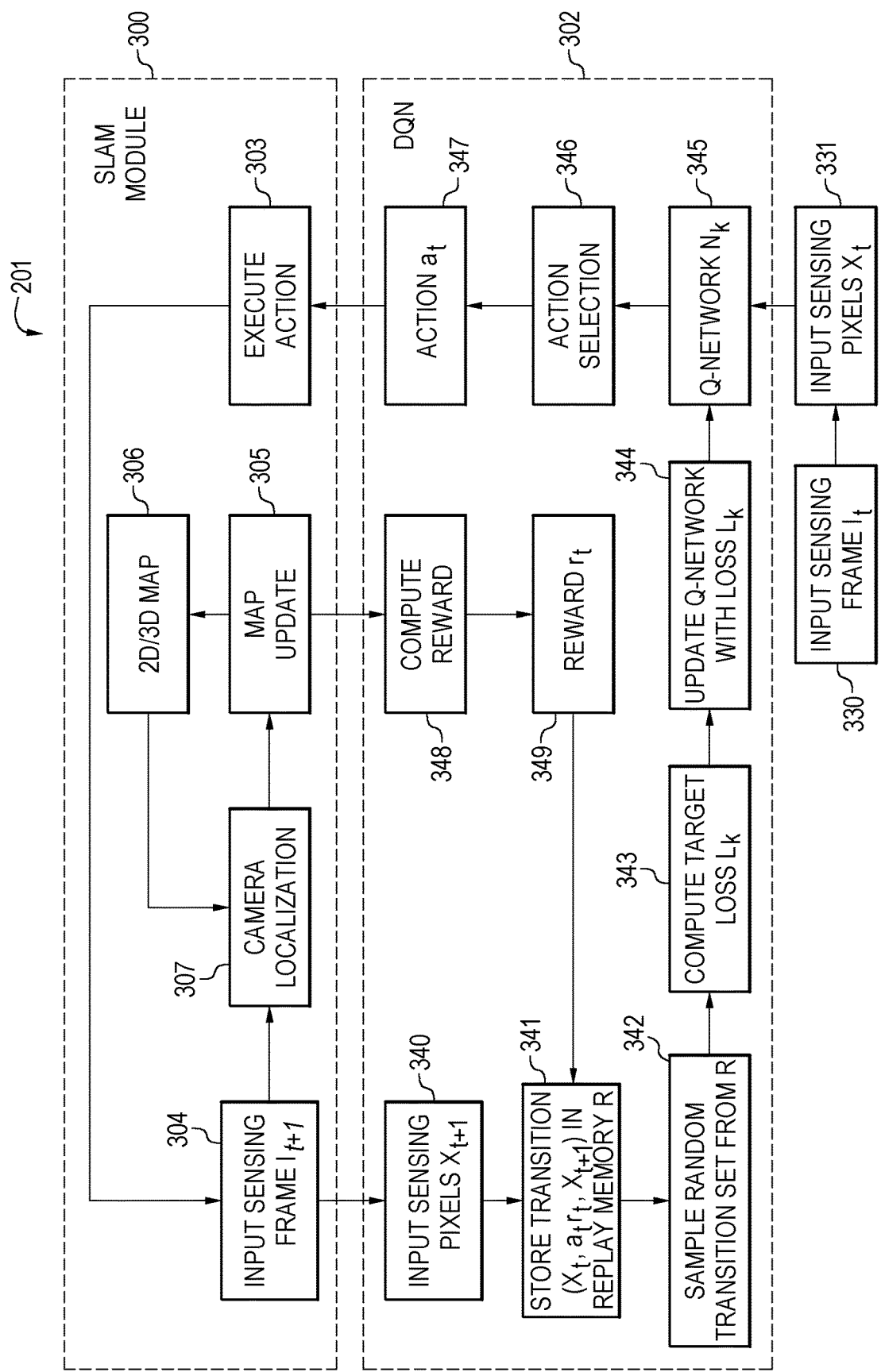
FIG. 3 is a flowchart of a method for performing a training mode, according to the embodiment of FIG. 2.

FIG. 3 is a flowchart of the method for performing the training mode 201, according to the embodiment of FIG. 2. In block 330, the system receives a sensing frame I at time t from a sensor. Thus, this frame is represented by $I_t$.

The sensor may be a red/green/blue (RGB) image sensor (e.g., video camera, still image camera), an RGB-Depth (RGB-D) sensor, or a depth sensor such as radar, LIDAR, or sonic. The listed sensors are for purposes of illustration only as other sensors may be used to generate the sensing frame $I_t$.

In the case of the RGB image sensor, the input sensing frame $I_t$ is an RGB image where each pixel in the sensing frame $I_t$, at location $(x_t, y_t)$, may be represented by three pixel values: $r(x_t, y_t)$, $g(x_t, y_t)$ and $b(x_t, y_t)$. Each pixel value corresponds to the red (R), green (G), and blue (B) channels, respectively.

In the case of the RGB-D sensor, such as a Microsoft Kinect® RGB-D sensor, the input sensing frame $I_t$ is a RGBD image, where each pixel at location $(x_t, y_t)$ not only has the three pixel values of $r(x_t, y_t)$, $g(x_t, y_t)$ and $b(x_t, y_t)$ corresponding to the R, G, and B channels, respectively, but also has a depth value represented by $d(x_t, y_t)$.

In the case of the depth sensor, the input sensing frame $I_t$ is a depth image, where each pixel at location $(x_t, y_t)$ has a depth value represented by $d(x_t, y_t)$. Any of the above embodiments of sensors may also be combined.

At block 331, a sensing input $X_t$ is generated from $I_t$ by, for example, concatenating the values of every pixel at every location $(x_t, y_t)$ of the frame $I_t$. $X_t$ thus represents the input sensing pixels being input into the reinforcement learning module 302 at block 345. The reinforcement learning module may also be referred to as a deep Q-network (DQN).

Q-learning in the DQN module 302 can be used to find an optimal action-selection policy for any given (finite) Markov decision process (MDP). It works by learning an action-value function that ultimately gives the expected utility of taking a given action in a given state and following the optimal policy thereafter, where the policy is a rule that the robotic device follows in selecting actions, given the state it is in. When such an action-value function is learned, the optimal policy can be constructed by simply selecting the action with the highest value in each state. One of the strengths of the DQN is that it is able to compare the expected utility of the available actions without requiring a model of the environment. Additionally, Q-learning can handle problems with stochastic transitions and rewards, without requiring any adaptations. It has been proven that for any finite MDP, Q-learning eventually finds an optimal policy, in the sense that the expected value of the total reward return over all successive steps, starting from the current state, is the maximum achievable.

Thus, given the sensing input $X_t$ at time t, from block 331, and given a set of m possible actions of the system as represented by $a_{t1}, a_{t2}, \ldots, a_{tm}$ (at the time stamp t), in block 345 the Q-network $N_k$ determines estimated Q-values for all possible actions $Q(a_{t1}, X_t), Q(a_{t2}, X_t), \ldots, Q(a_{tm}, X_t)$. These are determined in a feedforward fashion. The actions may include moving right, moving left, moving forward, moving in reverse, or some combination of these.

The possible actions $a_{t1}, a_{t2}, \ldots, a_{tm}$ are defined based on discretization of the possible moving directions in a 2D or 3D coordinate system of the 2D or 3D environment map. For example, in a 2D environment map, a current 4 Degree-of-Freedom (DoF) location may be represented by $T_t$ and a pose space (i.e., location and orientation) for the robotic device may be represented by $R_t$. Thus, $T_t$ and $R_t$ denotes the 2D coordinate and orientation of the robotic device at time t in the 2D map environment. In this case, m possible moving actions can be obtained by discretizing the 2D space on the 2D mapping plane. For example, the possible actions can have 2 degrees of freedom, moving direction and moving step, where moving the direction can be $\varphi, 2\varphi, \ldots, h\varphi$, and moving step can be $\mu, 2\mu, \ldots, l\mu$, and $l \times h = m$. Each combination of moving direction and moving step corresponds to one possible action for the robotic device to move.

Similarly, in a 3D environment map, the current 6 DoF location $T_t$ and pose space $R_t$ denotes the 3D coordinate and orientation of the robotic device at time t. In this case, m possible moving actions can be obtained by discretizing the 3D space. For example, one can discretize the z-axis first to obtain a few planes and, in each plane, the 2D plane can be discretized similar to the above-described method.

In view of the above, in block 346, an action is selected at time t for all possible actions $Q(a_{t1}, X_t), Q(a_{t2}, X_t), \ldots, Q(a_{tm}, X_t)$, based on the estimated Q-values determined previously. An $\varepsilon$-greedy method may be performed, where $\varepsilon$ is a probability number between 0 and 1 where. With probability $\varepsilon$, a random action $a_t$ is selected and, with a possibility represented by $1-\varepsilon$, the optimal action represented by $a_t$ with maximum Q-value is selected at block 347 by:

$$a_t = \mathrm{argmax}_{a_{ti}} Q(a_{ti}, X_t)$$

The selected action $a_t$ is then input to the SLAM module 300. In block 303, the robotic device executes the selected action $a_t$ by moving itself according to the moving direction and step defined by the action $a_t$. In block 304, a new sensing frame $I_{t+1}$ can be obtained from the sensor at time t+1. The new sensing frame $I_{t+1}$ is input back to the reinforcement learning module DQN module 302 as well as used in the SLAM module 300 to locate the camera and perform a map update.

In block 307 of the SLAM module 300, the new sensing frame $I_{t+1}$ is used to compute the camera location in the 2D or 3D map. The camera location may be determined in multiple ways for both the 2D and 3D map environments.

For example, in a 2D map environment, the camera may be located using a particle filtering-based method. One such particle filtering-based method is described in the work of G. Grisetti et al., in the article *Improved Techniques for Grid Mapping with Rao-Blackwellized Particle Filters* published in IEEE Transactions on Robotics, 23:34-46, 2007. This method may be used to compute a new 4 Degree-of-Freedom (DoF) camera location $T_{t+1}$ and pose space $R_{t+1}$, based on previous sensing frame $I_t$ and new sensing frame $I_{t+1}$ as well as the past camera location $T_t$ and pose space $R_t$.

In another example, in a 3D map environment using an RGB image, the camera may be located using salient feature points (e.g., corner points or angles of objects in the map environment) that are extracted from the previous frame $I_t$ and tracked in the new frame $I_{t+1}$. The tracking may be accomplished, for example, by matching the previous salient feature points to salient feature points computed from new sensing frame $I_{t+1}$. Based on such tracked set of feature points in the two frames, as well as the past camera pose space $R_t$ and location $T_t$ of the robotic device in the 3D map, the new 6 DoF camera location $T_{t+1}$ and pose $R_{t+1}$ can be computed.

In some cases, there may not be any salient features to track between frames $I_t$ and $I_{t+1}$, rendering the computed camera location as undefined. In such cases, additional steps may be needed to compute $R_{t+1}$ and $T_{t+1}$. such as the re-localization method where the 3D map points are matched to the salient feature points computed from new frame $I_{t+1}$ and, based on the 2D-3D matched points, the Perspective-n-Point (PnP) can be used to compute $R_{t+1}$ and $T_{t+1}$. One such example of this process is described in V. Lepetit et al., "EPnP: An Accurate O(n) Solution to the PnP Problem," International Journal of Computer Vision 81 (2): 155-166.

Various methods can be used to find the 2D-3D matched points based on the computed distances between the descriptors of the 2D salient feature points computed from new frame $I_{t+1}$ and the descriptors of the 3D points. For example, a brute force "nearest neighbor matching" or a fast approximate "nearest neighbor matching" method may be used.

There are also various ways to determine the descriptors of the 3D matched points. For example, a 3D matched point can be simply represented by a set of descriptors comprising the descriptors of the 2D salient feature points that triangulate to obtain the 3D point. The descriptors of the salient feature points match to the 3D point in the following frames. Also, a set of representative descriptors can be computed from this set of descriptors. For example, clustering methods may be used to represent the 3D point.

Various types of descriptors can be used, such as the Scale-Invariant Feature Transform (SIFT) descriptor, Speeded UP Robust Features (SURF) descriptor, Oriented Features from Accelerated Segment Test (FAST) or Rotated Binary Robust Independent Element Features (BRIEF) (ORB) descriptor. These descriptor types are for purposes of illustration only as other embodiments may use other descriptors.

In some special cases, not enough salient points can be computed from the frame $I_{t+1}$. In such a case, additional inputs from inertial motion sensors such as gyroscopes, accelerometers, and/or compasses can be used to help with robust camera localization. In a 3D map, when the Depth information can be obtained from a depth sensor, the 3D points can be registered between frame $I_t$ and frame $I_{t+1}$, and between frame $I_{t+1}$ and the 3D map. Such 3D-to-3D correspondences can be used for camera localization. The disclosed method is not limited to any one particular camera localization method.

In block 305, the 2D or 3D map is updated to generate a new 2D/3D map in block 306. The map updates may be accomplished in several different ways based on $R_t$, $T_t$, $R_{t+1}$, $T_{t+1}$, and the 2D-2D and/or 2D-3D point correspondences.

One example way to update the map includes, for each existing 3D point in the map, updating the descriptor representation of the 3D point using a matching 2D salient feature point if a 2D salient feature point is matching a particular 3D point. In some embodiments, the 3D location of the 3D point is also updated based on the new matching 2D salient feature point. There are various ways to perform such an update. For example, a candidate 3D location can be triangulated using each pair of 2D key points corresponding to the 3D point and the final 3D location of the 3D point can be some statistically computed (e.g., statistical mean) from these candidates. New 2D or 3D map points may also be added into the existing 2D or 3D map.

For different sensing systems (e.g., based on RGB, RGBD, or Depth sensor), different processes may be used for adding new map points. Also, the updating method may vary between 2D and 3D maps. For example, for Depth sensors, the particle filtering based method can be used for 2D map update as described above. For RGB sensors, triangulation methods may be used for 3D map update. These described map update methods are for purposes of illustration only as the embodiments herein do not put constraints on how the 2D or 3D maps are updated.

The updated map from block 306 is used in the camera localization process 307. The map updates from block 305 are also used in the reward system of block 348 as described subsequently.

In block 340 of the DQN module 302, a new sensing input $X_{t+1}$ is generated from the new frame $I_{t+1}$ from block 304 by, for example, concatenating the values of every pixel at every location $(x_{t+1}, y_{t+1})$ in the frame.

In block 341, a transition set $(X_t, a_t, r_t, X_{t+1})$ is generated from the previous transition $X_t$, the new transition $X_{t+1}$, the selected action $a_t$, and a reward function result represented by $r_t$. The reward function $r_t$ of block 349 is computed in block 348 as described subsequently.

The transition set $(X_t, a_t, r_t, X_{t+1})$ is stored into a replay memory, and the above process continues to the next time stamp t+1. The replay memory normally has a finite storage limit and, once the storage limit has been reached, the oldest transition set may be replaced by the newly added transition set.

In blocks 348 and 349 of the DQN module 302, the reward $r_t$ is computed. Subsequent reward description uses three types of rewards for illustration purposes only. Depending on the robotic device, environment map, and robotic device use, other reward systems may be used.

A map coverage reward, represented by $r_c$, is used to avoid redundant map traversal. A map quality reward, represented by $r_q$, is used to avoid failures of the camera localization 307. A traversability reward, represented by $r_v$, is used to avoid dynamic obstacles.

The coverage reward $r_c$ may be defined as a non-overlapping area of the Field of View (FoV) of the sensing frame $I_{t+1}$ with the existing 2D or 3D map. Such an area can be estimated by the amount of new map points added to the 2D or 3D map. Higher values of reward $r_c$ encourage the robotic device to reduce the redundant scanning of already mapped areas. Lower values of reward $r_c$ encourage the robotic device to increase the redundant scanning.

The map quality reward $r_q$ may be defined as a number of robustly tracked salient feature correspondences in sensing frames. Such feature correspondences can be 2D-to-2D correspondences, when RGB images are used, or 3D-to-3D correspondences when the depth information is available from either RGB-D or Depth sensors.

Since the camera localization process 307 in the SLAM module 300 is important for the success of the SLAM operation, reward $r_q$ encourages the robotic device to automatically adjust its action decision (i.e., moving direction and speed) according to the condition of the environment map to improve the robustness of camera localization. If the robotic device moves too fast from one area to another and/or rotates too fast from one orientation to another, it can be hard for the system to localize itself after the movement or rotation due to the difficulty of tracking and feature matching. Also, if the robotic device is scanning an area having relatively smooth surface without many salient feature points, it can add difficulty to camera localization.

The traversability reward $r_v$ may be defined as the inverse of an average distance between the robotic device and potential obstacles in the 2D or 3D map environment. This reward may be expressed as:

$$r_v = \frac{1}{average_{T_m \in \Omega}\{Dist(T_{t+1}, T_m)\}},$$

where Dist is a distance measurement, such as Euclidean distance measurement, and $T_m \in \Omega$ are a set of map points that represent the surface of an obstacle or wall of the map environment and are within a distance threshold to $T_{t+1}$.

There are various ways to determine the set of map points $T_m \in \Omega$. For example, $T_m \in \Omega$ may be the map points whose Truncated Signed Distance Function (TSDF) have zero values and are within a certain distance threshold defined by the distance measurement with the robotic device location Tt+1. Higher reward $r_v$ values encourage the robotic device to avoid bumping into obstacles and walls.

A total reward may be represented as $r_t$. This reward is computed as the combination of $r_c$, $r_q$, and $r_v$ and may be expressed as:

$$r_t = \alpha r_c + \beta r_q \gamma r_v$$

where $\alpha$, $\beta$, and $\gamma$ are weighting factors. The weighting factors may be pre-assigned empirically or may be learned as another set of parameters via cross-validation.

In the training stage 201, the robotic device updates the Q-network at a frequency of every k time stamps, where k≥1. Specifically, for the $k^{th}$ update of the Q-network, the robotic device aims to update Q-network from $N_{k-1}$ to $N_k$. The robotic device first randomly samples a number of transition sets from the replay memory in block 342 and then, for each transition set $(X_j, a_j, r_j, X_{j+1})$, the robotic device computes a target $y_j$ using the current Q-network $N_{k-1}$ by:

$$y_j = r_j + \eta \max_a Q(a, X_{j+1}),$$

if $X_j$ is not a terminal sensing input. The target $y_j$ is expressed by:

$$y_j = r_j,$$

if $X_j$ is a terminal sensing input. Target $y_j$ is a computed target Q-value after taking an optimal action at time stamp j. It is computed as the current reward plus an estimated optimal Q-value after observing the new sensing frame $X_{j+1}$ determined by the current Q-network $N_{k-1}$ with parameters $\theta_k$. The parameter $\eta$ is the forgetting factor valued between 0 and 1 and determines how important the system weights long-term rewards against short-term ones. The smaller the forgetting factor, the robotic device weights less on long-term rewards but cares only for the short-term rewards. If the forgetting factor is closer to 1, the robotic device tends to treat long-term rewards similarly with the short-term rewards.

A target loss may be used to update the parameters in the Q-network. $Q(a_j, X_j)$ is the Q-value computed by a target network N' by taking the actual action $a_j$ in the transition set with the input $X_j$, and $y_j$ is the target Q-value that one hopes the updated Q-network to generate at time stamp j. The target network N' is basically the same with the Q-network. The only difference is that the target network is updated slower than the Q-network. In other words, the Q-network is copied to the target network N' after every C updates. The use of the target network is to help stabilize the updates of the Q-network In block 343, the robotic device computes the target loss, represented by $L_j$, by:

$$L_j = (y_j - Q(a_j, X_j))^2$$

and computes the gradient of by:

$$\nabla_{\theta_k} L_j = E\{(y_j - Q(a_j, X_j)) \nabla_{\theta_k} Q(a_j, X_j)\}$$

where $\theta_k$ are parameters in Q-network $N_{k-1}$. In block 344, the Q-network $N_{k-1}$ is updated into $N_k$ by performing a gradient descent step through backward propagation based on the gradient of $L_j$. In an embodiment, the expectation of the gradient of $L_j$ is computed by statistical methods (e.g., stochastic gradient descent (SGD)).

FIG. 4 is a flowchart of the method for performing the testing mode 202, according to the embodiment of FIG. 2. After the training stage 201, in the testing stage 202 the robotic device can now effectively conduct SLAM operations in a new unknown dynamic environment with the help of the trained Q-network N that was obtained from the training stage 201. Thus, the robotic device can avoid SLAM tracking failures, redundant map traversal, and dynamic obstacles.

Specifically, at block 410, the robotic device takes or receives a sensing frame $I_t$ as input at time t from the sensor. Examples of sensors are described previously (e.g., video RGB camera, RGB-D sensor, depth sensor).

In block 411, the robotic device generates a sensing input $X_t$ from sensing frame $I_t$ in the same way as in the training stage by, for example, concatenating the values of every pixel at every location $(x_t, y_t)$.

In block 412, given the sensing input $X_t$ at a time stamp t and given a set of m possible actions $a_{t1}, a_{t2}, \ldots, a_{tm}$ of the SLAM system at the time stamp t, the Q-network N determines the estimated Q-values for all the possible actions $Q(a_{t1}, X_t), Q(a_{t2}, X_t), \ldots, Q(a_{tm}, X_t)$, in a feedforward fashion. The possible actions $a_{t1}, a_{t2}, \ldots, a_{tm}$ are defined based on discretization of the possible moving directions in the 2D or 3D coordinates in the 2D or 3D environment map, in the same way as in the training process. Based on the estimated Q-values for all these possible actions $Q(a_{t1}, X_t), Q(a_{t2}, X_t), \ldots, Q(a_{tm}, X_t)$, the action selection process at blocks 413 and 414 selects an action at for time t. Usually an ε-greedy method is preferred where, with probability ε, a random action at is selected and, with possibility 1−ε, the optimal action $a_t$ with maximum Q-value is selected by:

$$a_t = \operatorname{argmax}_{a_{ti}} Q(a_{ti}, X_t)$$

The robotic device executes the selected action $a_t$, at block 415, by moving itself according to the moving direction and step defined by the selected action $a_t$. In block 416, a new sensing frame $I_{t+1}$ can be obtained from the sensor at time t+1 and the robotic device generates a new sensing input $X_{t+1}$ in response to the new sensing frame $I_{t+1}$ by, for example, concatenating the values of every pixel at every location $(x_{t+1}, y_{t+1})$ in the frame.

The sensing frame $I_{t+1}$ is used as the input of the SLAM module 300, in the same way as in the training stage 201. First, the module computes the camera location, at block 417, using $T_{t+1}$ and pose space $R_{t+1}$ in the 2D or 3D map based on the new sensing frame $I_{t+1}$. Then the 2D or 3D map is updated, in block 418 to generate a new 2D/3D map at block 419. The update may occur in several different ways based on $R_t$, $T_t$, $R_{t+1}$, $T_{t+1}$, and the 2D-to-2D and/or 2D-to-3D point correspondences as described previously with reference to the training stage 201 of FIG. 3. After the map update, the robotic device proceeds to the next time stamp and repeats the process for any further movement.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors may be configured by firmware or software (e.g., instructions, an application portion, or an application) as a module that operates to perform specified operations. In an example, the software may reside on a transitory or non-transitory computer readable medium. In an example, the software, when executed by the underlying hardware of the module, causes the hardware to perform the specified operations.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. The software may be executed on a digital signal processor, ASIC, microprocessor, or other type of processor operating on a computer system, such as a personal computer, server or other computer system, turning such computer system into a specifically programmed machine.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A robotic device having a deep reinforcement learning capability, the robotic device comprising:
   non-transitory memory comprising instructions; and
   one or more processors in communication with the memory, wherein the one or more processors execute, during a training mode of the robotic device, the instructions to:
      receive a sensing frame, from a sensor, comprising an image;
      determine estimated Q-values of a Deep Q-Network (DQN) based on a plurality of pixels of the sensing frame;
      select, during a deep reinforcement learning process of the training mode, an action from a plurality of defined actions based on the estimated Q-values, each of the plurality of defined actions associated with a movement of the robotic device in an area map, the movement characterized by a moving direction and a moving step;
      cause execution of the selected action, during a visual simultaneous localization and mapping (SLAM) process of the training mode, the execution of the selected action resulting in movement of the robotic device according to the moving direction and the moving step associated with the selected action;
      determine, during the visual SLAM process, map updates based on a second sensing frame from the sensor;
      determine, during the deep reinforcement learning process of the training mode, a subsequent movement for the robotic device based on the second sensing frame, the second sensing frame obtained during the visual SLAM process and based on the execution of the selected action, wherein the deep reinforcement learning process further uses at least one of a map coverage reward, a map quality reward, or a traversability reward corresponding to the map updates to determine the subsequent movement;
      update the area map based on the map updates; and
      update the estimated Q-values of the DQN based on the determined subsequent movement.

2. The robotic device of claim 1, wherein the sensor comprises at least one of an image sensor or a depth sensor.

3. The robotic device of claim 1, wherein the one or more processors execute instructions to concatenate values of each of the plurality of pixels to generate a sensing input to the deep Q-network, wherein the deep Q-network is configured to generate the estimated Q-values based on the sensing input.

4. The robotic device of claim 3, wherein the plurality of defined actions of the robotic device include moving right, moving left, moving forward, moving in reverse, or a combination thereof.

5. The robotic device of claim 4, wherein the one or more processors execute instructions to generate the second sensing frame from the sensor subsequent to the sensing frame.

6. The robotic device of claim 5, wherein the one or more processors execute instructions to determine a robotic camera location in a map environment associated with the area map based on the second sensing frame and using a 2D or 3D localization technique.

7. The robotic device of claim 6, wherein the one or more processors execute instructions to determine the robotic camera location by using a particle filtering method or extracting salient points from the sensing frame and tracking the salient points in the second sensing frame.

8. The robotic device of claim 6, wherein the one or more processors execute instructions to use the map updates to determine the robotic camera location.

9. The robotic device of claim 1, wherein the one or more processors execute instructions for the deep reinforcement learning to:
   weighting the map coverage reward, the map quality reward, and the traversability reward using a plurality of empirically pre-assigned weighting factors to generated weighted rewards; and
   determine the subsequent movement based on a sum of the weighted rewards.

10. A computer-implemented method for mapping with deep reinforcement learning in a robotic device, the method comprising:
   receiving a sensing frame, from one or more sensors, comprising an image;
   determining estimated Q-values of a Deep Q-Network (DQN) based on a plurality of pixels of the sensing frame;
   selecting, during a deep reinforcement learning process, an action from a plurality of defined actions based on the estimated Q-values, each of the plurality of defined actions associated with a movement of the robotic device in an area map, the movement characterized by a moving direction and a moving step;
   causing execution of the selected action, during a visual simultaneous localization and mapping (SLAM) process, the execution of the selected action causing movement of the robotic device according to the moving direction and the moving step associated with the selected action;
   determining, during the visual SLAM process, map updates based on a second sensing frame from the sensor;
   determining, during the deep reinforcement learning process, a subsequent movement for the robotic device based on the second sensing frame, the second sensing frame obtained during the visual SLAM process and based on the execution of the selected action, wherein the deep reinforcement learning process further uses a plurality of rewards associated with the area map to determine the subsequent movement;
updating the area map based on the map updates; and
updating the estimated Q-values of the DQN based on the determined subsequent movement.

11. The computer-implemented method of claim 10, further comprising:
determining a total reward based on a sum of a map coverage reward, a map quality reward, and a traversability reward; and
determining a transition set associated with the subsequent movement, the transition set comprising a stochastic transition generated from the sensing frame, a stochastic transition generated from the second sensing frame, the action, and the total reward.

12. The computer-implemented method of claim 11, further comprising randomly sampling at least one transition set from a plurality of transition sets corresponding to the determined transition set to generate a target loss.

13. The computer-implemented method of claim 12, further comprising updating the deep Q-network based on the target loss.

14. The computer-implemented method of claim 11, wherein the selected action is determined based on a total reward $r_t = \alpha r_c + \beta r_q + \gamma r_v$, wherein $r_c$ is the map coverage reward, $r_q$ is the map quality reward, $r_v$ is the traversability reward, and $\alpha$, $\beta$, $\gamma$ are reward weights.

15. A non-transitory computer-readable media storing computer instructions for visual simultaneous localization and mapping with deep reinforcement learning in a robotic device, that when executed by one or more processors, cause the one or more processors to perform, during a training mode of the robotic device, the steps of:
receive a sensing frame, from a sensor, comprising an image;
determine estimated Q-values of a Deep Q-Network (DQN) based on a plurality of pixels of the sensing frame;
select, during a deep reinforcement learning process of the training mode, an action from a plurality of defined actions based on the estimated Q-values, each of the plurality of defined actions associated with a movement of the robotic device in an area map, the movement characterized by a moving direction and a moving step;
cause execution of the selected action, during a visual simultaneous localization and mapping (SLAM) process of the training mode, the execution of the selected action causing movement of the robotic device according to the moving direction and the moving step associated with the selected action;
determine, during the visual SLAM process, map updates based on a second sensing frame from the sensor;
determine, during the deep reinforcement learning process, a subsequent movement for the robotic device based on the second sensing frame, the second sensing frame obtained during the visual SLAM process and based on the execution of the selected action, wherein the deep reinforcement learning process further uses a total reward comprising a map coverage reward, a map quality reward, and a traversability reward associated with the area map to determine the subsequent movement of the robotic device;
update the area map based on the map updates; and
update the estimated Q-values of the DQN based on the determined subsequent movement.

16. The non-transitory computer-readable media of claim 15, wherein the computer instructions further cause the one or more processors to:
concatenate values of each of the plurality of pixels of the sensing frame to generate a sensing input to the deep Q-network; and
generate the estimated Q-values for possible actions of the robotic device based on the sensing input, wherein the possible actions are based on discretization of possible moving directions in a coordinate system representing an environment map.

17. The non-transitory computer-readable media of claim 16, wherein the computer instructions further cause the one or more processors to locate the sensor by:
extraction of salient feature points from the sensing frame;
tracking of the salient feature points in the second sensing frame by matching the salient feature points to salient feature points from the second sensing frame; and
determining a sensor pose space and location in a three dimensional map.

18. The non-transitory computer-readable media of claim 17, wherein the salient feature points are represented by a set of descriptors.

19. The non-transitory computer-readable media of claim 18, wherein the set of descriptors comprise Scale-Invariant Feature Transform (SIFT) descriptors, Speeded UP Robust Features (SURF) descriptors, Oriented Features from Accelerated Segment Test (FAST) or Rotated Binary Robust Independent Element Features (BRIEF) (ORB) descriptors.

20. The non-transitory computer-readable media of claim 17, wherein the computer instructions further cause the one or more processors to locate the sensor by input from inertial motion sensors of the robotic device.

* * * * *